US008676956B1

(12) United States Patent
Johnson et al.

(10) Patent No.: US 8,676,956 B1
(45) Date of Patent: Mar. 18, 2014

(54) METHOD AND SYSTEM FOR MONITORING NETWORK RESOURCES UTILIZATION

(75) Inventors: Kerry Johnson, Kanata (CA); Leo Forget, Kanata (CA)

(73) Assignee: Alcatel Lucent, Paris (FR)

( * ) Notice: Subject to any disclaimer, the term of this patent is extended or adjusted under 35 U.S.C. 154(b) by 935 days.

(21) Appl. No.: 09/946,195

(22) Filed: Sep. 5, 2001

(51) Int. Cl.
*G06F 15/173* (2006.01)

(52) U.S. Cl.
USPC ............ 709/224; 359/110; 359/118; 359/124

(58) Field of Classification Search
USPC .......................... 703/224; 398/25–38, 58–64
See application file for complete search history.

(56) References Cited

U.S. PATENT DOCUMENTS

| | | | | |
|---|---|---|---|---|
| 5,440,719 | A * | 8/1995 | Hanes et al. | 703/21 |
| 5,903,757 | A * | 5/1999 | Gretz et al. | 717/127 |
| 6,075,630 | A * | 6/2000 | Nishio | 398/25 |
| 2002/0131116 | A1* | 9/2002 | Shimomura et al. | 359/124 |
| 2002/0141009 | A1* | 10/2002 | Yu et al. | 359/110 |
| 2002/0156914 | A1* | 10/2002 | Lo et al. | 709/238 |
| 2002/0176131 | A1* | 11/2002 | Walters et al. | 359/118 |
| 2002/0191250 | A1* | 12/2002 | Graves et al. | 359/128 |
| 2003/0020979 | A1* | 1/2003 | Bell | 359/110 |
| 2003/0055863 | A1* | 3/2003 | Spiegel et al. | 709/104 |
| 2003/0061362 | A1* | 3/2003 | Qiu et al. | 709/229 |
| 2004/0213221 | A1* | 10/2004 | Civanlar et al. | 370/389 |

OTHER PUBLICATIONS

Photonic Networking Using Optical Add Drop multiplexers and Optical Cross-Connections, by Chikama, Onaka and Kuroyanagi, Fujitsu Sci. Tech. J., 35, pp. 46-55 (Jul. 1999).
A Novel 240-Gbps Channel-By-Channel Dedicated Optical Protection ring Network Using Wavelength Selective Switches, by Rhee, Li Iydroose et al, Coming Incorporated, PD 39-1.

* cited by examiner

*Primary Examiner* — Barbara Burgess
(74) *Attorney, Agent, or Firm* — Capitol Patent & Trademark Law Firm, PLLC

(57) ABSTRACT

A system and method are provided for monitoring utilization of network resources in a photonic network. A monitoring threshold is set for monitoring utilization of network components of interest. A resource utilization data processor obtains resource utilization data indicating utilization of the network resources. A threshold crossing determination unit determines if threshold crossing has occurred based on the utilization data and the monitoring threshold. A user interface indicates the utilization of the network components in accordance with the determination of the threshold crossing.

30 Claims, 6 Drawing Sheets

METHOD AND SYSTEM FOR MONITORING NETWORK RESOURCES UTILIZATION

This invention relates to optical communication networks, and more particularly, to method and system for monitoring network resource utilization in a photonic network.

BACKGROUND OF THE INVENTION

As known in the art, WDM (wavelength division multiplexing) refers to optical transmission technology where multiple optical signals are transmitted simultaneously on a single optical fiber using different wavelengths of the light (channels). The ever-growing demand for bandwidth is driven by a wide range of services that are now provided over optical networks, such as transmission of e-mail, video, multimedia and voice.

Wavelength Division Multiplexing (WDM) and lately dense WDM (DWDM) have been developed in order to respond to the demand for bandwidth, and became the transmission technology of choice. D/WDM is a physical layer technology that combines and transmits multiple signals simultaneously at different wavelengths on a same fibre. D/WDM is bit-rate and protocol independent. Accordingly, DWDM-based networks can carry different types of traffic at different speeds over an optical fibre, e.g., transmit data in Internet Protocol (IP), Asynchronous Transfer Mode (ATM), and Synchronous Optical Network/Synchronous Digital Hierarchy (SONET/SDH), at a wide range of bit-rates.

The number of backbone providers increased lately, resulting in important decreases in the profit margin of individual providers, while the demand for bandwidth is still healthy. As a result, service provider business has evolved to a point where the quality of the services offered, and also the time it takes to set up new services became a very important factor. Deployment of new services means adding new network resources (equipment and functionality) and downloading the corresponding software to configure, manage and control these resources. Nonetheless, though the D/WDM helped to increase the bandwidth on a fiber link, it did not help to reduce the cost of the network and the service activation time (also called time-to-bandwidth TTB) for various reasons.

Primarily, the current WDM network is provisioned in a point-to-point configuration, where all channels are terminated (optical-electrical-optical or OEO converted) at each node. With this architecture, each new wavelength must be ordered, deployed and engineered separately, involving manual procedures such as retrieval of resource inventory and evaluation as to whether sufficient resources exist. Such manual procedures are time and labour consuming. Also, these manual procedures are generally carried out only a few times a year, and often do not provide enough lead time for ordering new equipment. As a result, the service activation time remains quite large.

If the resource inventory could be automated important saving in service activation time could be obtained. However, this is not provided for in the current point-to-point architecture.

Another reason for the large network costs and large service activation times is that the current management systems cannot provide true agility at the transport layer due again to the current point-to-point configuration. There is a need to provide the network with efficient ways to allow implementation of new services with minimal costs to the network provider, while achieving rapid time to bandwidth (TTB).

'Network planning' is defined as the design of the network involving the architectural/technology selection, economic/budgetary comparisons, dimensioning/sizing the network elements, availability analysis, restoration analysis, demand forecasting, etc.

"Network engineering" is required to generate a physical link design and nodal design that will deliver on the specified network performance so that the provisioning application can establish optimal network operation. The output of the engineering stage feeds into the order process with detailed equipment lists and specifications along with configurations so that the installers know exactly where everything needs to be placed.

"Network commissioning" encompasses the operations of installing the equipment, powering-up the network, and testing while the network management system is not yet in place.

"Network provisioning" involves the intelligence required to translate a request for a service into at least one solution through the installed network.

The term 'network resources' or 'resources' is defined here as the services and equipment available in a network for serving users' requests. Examples of resources are network elements, such as transponders, regenerators, optical amplifiers, switches, OADMs, dispersion compensating equipment, etc.

Resources are also the wavelengths used to carry the user data signals, the number of ports available on a node and their assignment, the number of ports on the client's equipment and their assignment, the fiber connections between the nodes and the routing map, etc.

Transponders are the interfaces between the transport network and the service platform (e.g. a router, electric/optical cross-connect, ATM switch, SONET equipment). A bidirectional transponder generally comprises a long reach (LR) transmitter-receiver pair (Tx-Rx) on the transport network side, and a short reach (SR) Tx-Rx pair on the service platform side. A transponder processes the LR enabled optical signals to SR enabled signals. Since this processing often involves conversion of the channel wavelength and of the protocol, transmission rate, etc, the transponder effects optical-electrical-optical (OEO) conversion.

Regenerators also comprise a Rx-Tx pair for each channel and for each direction of transmission. A regenerator performs OEO conversion for re-timing, re-shaping and regenerating (amplifying) the optical signal to allow transmission over long distances.

There is a limited numbers of network resources available in a network. It is desirable to manage capacity of the optical network by better allocating these limited resources to requests. Also, if a network resource is nearing exhaust, more often new equipment needs to be deployed. Accordingly, it is desirable to monitor utilization of network resources so that they can be better allocated and new equipment can be ordered in time.

The term "request" or 'demand' refers to a user request for a circuit that sources at one node and sinks at another node. A request may have a quantity associated with it. An example of a request is: 2 circuits between Ottawa and New-York with a 0:2 path disjoint protection scheme.

SUMMARY OF THE INVENTION

It is an object of the invention to provide a photonic network with a method and system for monitoring network resources utilization, which obviates or mitigates at least one of the disadvantages of existing systems.

In accordance with an aspect of the present invention, there is provided a network utilization monitoring system for monitoring utilization of network resources in a photonic network.

The monitoring system comprises a resource utilization data processor, a threshold crossing determination unit and a user interface. The resource utilization data processor is provided for obtaining resource utilization data regarding network resources of interest. The threshold crossing determination unit is provided for determining if threshold crossing has occurred based on the utilization data and a pre-set monitoring threshold. The user interface is provided for indicating the utilization information of the network resources in accordance with the determination of the crossing determination unit.

In accordance with another aspect of the invention, there is provided a method for monitoring utilization of network resources in a photonic network. The method comprising steps of setting a monitoring threshold for monitoring utilization of network resources of interest, obtaining resource utilization data indicating utilization of the network resources, determining if threshold crossing has occurred based on the resource utilization data and the monitoring threshold, and indicating the utilization information of the network resources in accordance with the determination of the threshold crossing.

In accordance with another aspect of the invention, there is provided a method for presenting utilization information of network resources in a photonic network. The method comprises steps of presenting information of network resources to which a monitoring threshold is provisionable, accepting provisioning of a monitoring threshold for monitoring utilization of the network resources, and indicating the utilization information of the network resources by obtaining resource utilization data indicating utilization of the network resources, and determining if threshold crossing has occurred based on the utilization data and the monitoring threshold.

Advantageously, the invention enables proactive network engineering and network cost optimization. Thus, the network metrics information indicates when to expand the network, and the infrastructure needed for the expansion, so that the infrastructure can be deployed by the time it is effectively required. This reduces the traditional network provisioning interval.

Another advantage of the invention is that it provides information on resources that are under/over utilized so that the equipment can be re-deployed for optimal use of the network, which again results in cost savings to the network provider. Furthermore, this information can also be used to constrain deployment of new services through under-utilized sites.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
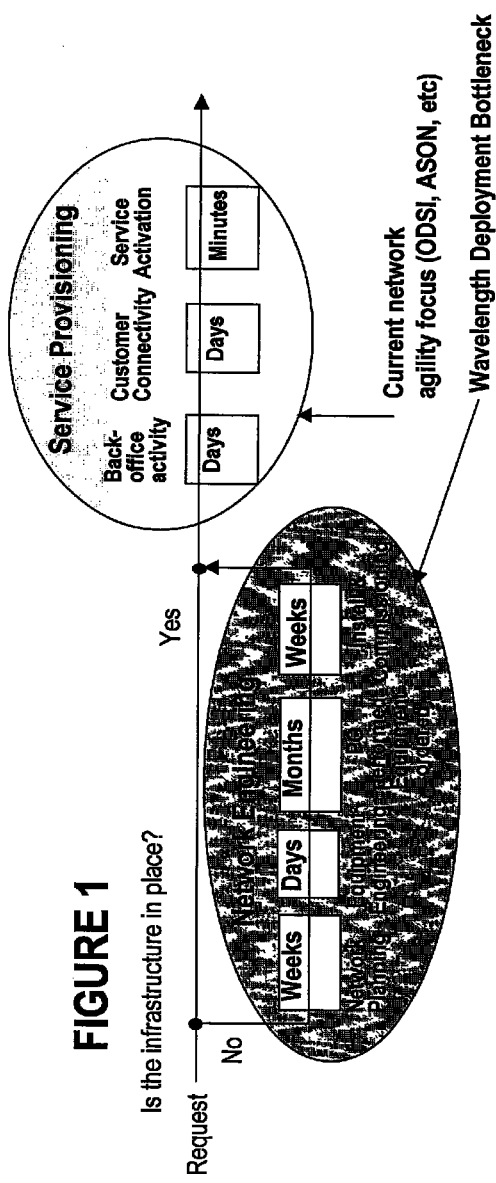
FIG. 1 illustrates the time-to-bandwidth breakdown for the current point-to-point networks.

FIG. 1 illustrates the time-to-bandwidth breakdown for a current network using point-to-point connectivity. This figure and the associated description are provided for better understanding how the TTB is reduced using the method and system for monitoring network resources utilization of the invention. The time-to-bandwidth (TTB) includes two components, namely the network engineering time, and the service provisioning time. If the equipment required to provision a new service is in place, TTB comprises only the service provisioning time, which is relatively low, being mainly limited by the carrier's own processes. It is dependent on extent of back office activity (days), the time for connecting the equipment (days), and the time needed for activating the service (minutes).

On the other hand, if the equipment required to provision a new service is not in place, TTB is much larger. Deploying a new service depends upon network capacity planning (weeks), equipment engineering (days), and most importantly, the time it takes to order and deliver specific wavelengths equipment for network capacity deployment (months). An important factor is also the time for installation and commissioning of the new service (weeks). If this "time-to-bandwidth" (TTB) could be reduced, a carrier would have a significant competitive advantage.

Unfortunately several practical factors prevent carriers from truly utilizing the value of DWDM with the current point-to-point network architectures. Thus, due to the high number of channels per fiber (up to 160 channels) the engineering time associated with circuit provisioning (i.e. point-to-point architecture) has in fact increased significantly, as each wavelength must be ordered, deployed and engineered separately. In addition, the interconnection between the nodes requires management at wavelength level. To make matters worse, no automation of the engineering process was developed yet.

As a result of these factors, the true potential of DWDM continues to be unexploited, and engineering effort continues to grow, while the average TTB of an optical service continues to increase. The following are the steps currently performed to add a channel between a source node A and a sink node Z:

(a) Provision/select two DWDM transmitter/receiver (Tx/Rx) units at every site A, B, . . . Y, Z, dedicated to the respective channel. If the Tx/Rx are not part of the existing inventory, they must be ordered and installed.
(b) Engineer nodes for the new wavelength.
(c) Increase laser power of the node transmitter gradually, while monitoring the other wavelengths present on the line between nodes A and B.
(d) Perform a power adjustment at each optical amplifier site (variable optical attenuator VOA adjustment).
(e) Once link A to B is equalized, run a 72 BER test.
(f) Repeat steps (a) to (e) for the remaining spans B-C to C-D . . . and Y-Z.
(g) Establish all cross-connections at the respective EXCs, for each node.
(h) connect the client interfaces at the end sites.

As indicated above, this process takes 6 to 20 weeks and requires a large number of specialized personnel (engineers and technicians).

The system according to the invention reduces the bottleneck at the network engineering stage of the current WDM networks. Firstly, the invention enables proactive network engineering by disconnecting the actual network from the network planning. This allows expanding the network when the network metrics indicate exhaustion of a certain resource, rather than when the additional resource is required due to a provisioning operation. In other words, the network planning is performed based on demand forecast, resulting in a significant decrease in planning time from weeks to days.

Figure 2:
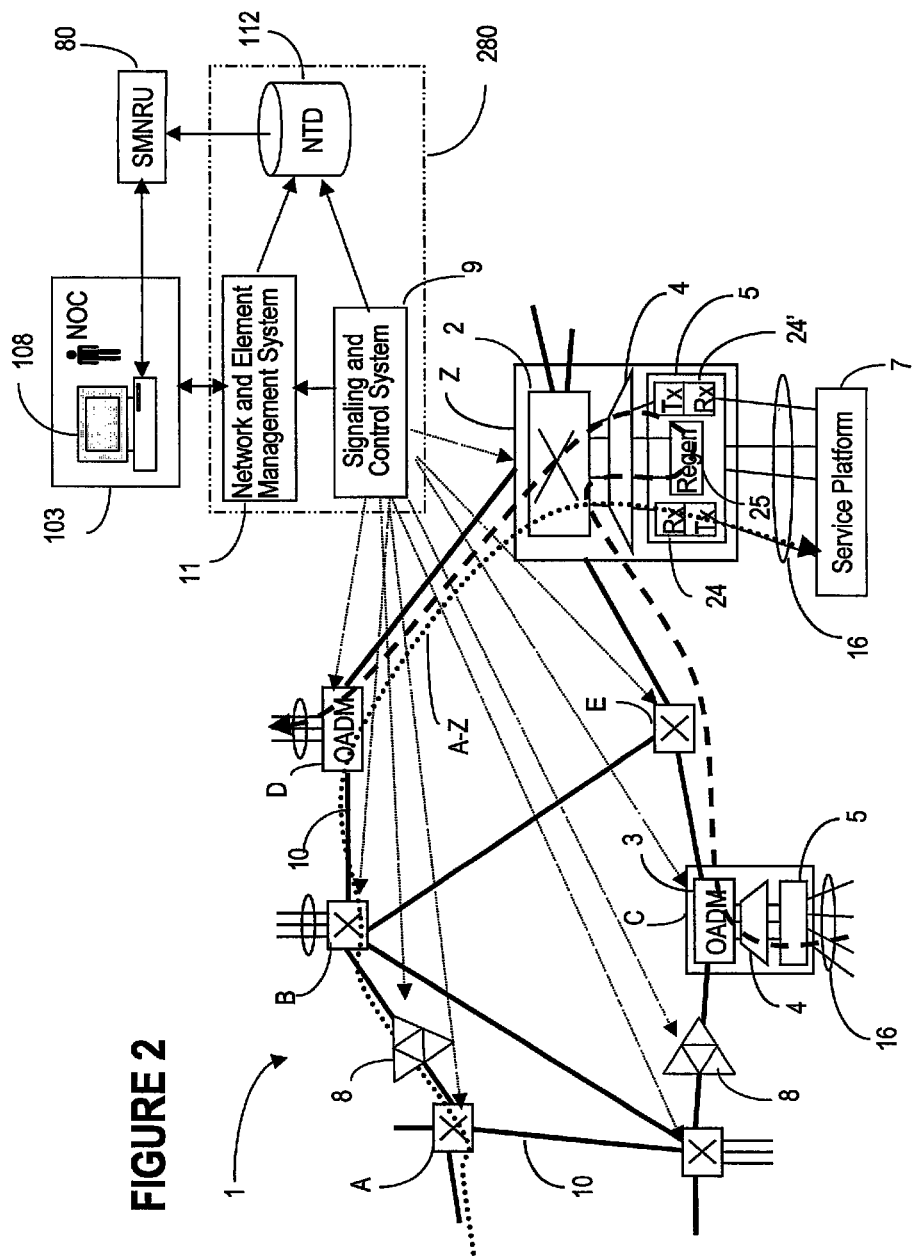
FIG. 2 is a block diagram showing an example of an optical network to which an embodiment of the present invention is applied.

FIG. 2 illustrates schematically an example of an optical transport network 1 where the present invention finds its applications. The architecture and operation of this network is described in co-pending applications "Architecture for a modular and scalable photonic network", U.S. Provisional Application No. 60/298,008 to Emery Et al, filed on Jun. 13, 2001, "Wavelength Routing and switching mechanism for a photonic network", U.S. patent application Ser. No. 09/909,265 to Smith et al filed on Jul. 19, 2001, and "Architecture for a photonic transport network", U.S. patent application Ser. No. 09/876,391 to Roorda et al, filed on Jun. 7, 2001, which are incorporated herein by reference.

To summarize, network 1 comprises bidirectional fiber links 10 connecting nodes A, B, C, D, E, F, Z. The nodes are switching nodes, such as nodes A, B, E, F, Z, OADM (optical add/drop multiplexing) nodes, such as nodes C, D, and such other network elements as bidirectional optical amplifiers 8, dispersion compensating equipment, which boost and groom the signals propagating between the flexibility sites. Local traffic 16 originating and terminating on service platform 7 (e.g. a router, an ATM switch, an EXC, etc.) accesses the network 1 at a flexibility site, as shown in some detail for switching node Z and OADM node C.

The optical network 1 may be partitioned into the following building blocks, which function together or, in some applications, independently:
- Electro-optics 5, shown at a switching node and an OADM node,
- Wavelength switches 2 provided at switching nodes,
- Optical add/drop multiplexer 3, provided at OADM nodes,
- Access multiplexing/demultiplexing and switching equipment 4, provided at switching nodes, and at some OADM nodes, such as node C, and
- Optical line sub-system post/pre amplification and line amplifier system 6, 8 provided on the links between the nodes, The electro-optics system 5 performs on/off ramp of client signals onto/from the optical network and interfaces into the access multiplexing and switching systems of the network. System 5 includes transponders 24, 24', which are the interface between the network and the service platform 7. Regenerators 25 provide OEO-based wavelength regeneration and conversion in the network core.

The wavelength cross-connect switches 2 and the optical add/drop multiplexers 3 provide optical passthru (bypass optical-to-electrical-to-optical (OEO) conversions), and optical add/drop of the local traffic from/to the electro-optics 5. Sites equipped with wavelength switches and OADMs are also called 'flexibility sites'. Both switches 2 and OADMs 3 may be scaled-up without changing the current configuration.

Access multiplexing/demultiplexing and switching equipment 4 routes the add and drop channels between the electro-optics sub-system 5 and the respective switch 2 or OADM 3. It provides distribution of individual wavelengths from the line system to the transponders/regenerators, and provides aggregation of individual wavelengths from the transponders/regenerators onto the line system.

A fiber optics link generally refers to the fiber between two flexibility sites and includes optical post/pre amplifiers, placed at each end of an optical link, optical line amplifiers placed at some other locations where further conditioning is needed, and associated dispersion and power management equipment necessary for ultra-long haul propagation along the line. Fibers 10 carry multi-channel optical signals, where a channel comprises a carrier signal modulated with the information.

A signaling and control system 9 is provided between all nodes and the optical line subsystem. The signaling and control system 9 in conjunction with an intelligent network and element management system 11 allows end-to-end photonic mesh network optical connection provisioning without manual intervention, selective regeneration for the passthru channels in need of conditioning, full transmitter wavelength agility and assignment, photonic layer wavelength user network interface (UNI), 3,000 km un-regenerated optical reach. System 9 also allows topology discovery and fault monitoring, and photonic layer network management. As new resources are added to the network, system 9 updates the network topology database 112 with the new resources, their location and connectivity, operating parameters, etc. Based on this information, the network and element management system 11 provides node and network inventory data and various metrics. This information is stored for both current and future use in a network topology database NTD 112 and contributes to automated commissioning and integrated planning and engineering applications. It is to be noted that this database is not necessarily provided on a unique hardware support as shown, and it can be distributed between the nodes.

The system for monitoring network resources utilization (SMNRSU) is shown generically at 80. System 80 uses the resource data from the network resource database and monitors the utilization of these resource using pre-set thresholds. Whenever a threshold is violated, an alarm is provided on terminal 108 at an NOC, so that the network resources can be re-deployed for optimal utilization, if possible. If after the optimization attempt, some resources are still under-equipped, the operator may place a purchase order in advance from the time when the respective resources are indeed needed. Alternatively, manual route selection can be used to avoid sites/links where resources are overutilized.

FIG. 2 also shows two routes A-Z and C-D. A channel A-Z, originates at switching node A, passes through switching nodes B and D in optical format, and is dropped at node Z to service platform 7. Channel C-D originates at flexibility site C, passes through node E in optical format, is OEO converted at node Z for regeneration and is dropped at node D. As shown for channel C-D, network 1 has the ability to determine if a channel needs regeneration, allocates a regenerator 25 available at one or more flexibility sites on the route of that channel, and processes the channel accordingly. The regenerators 25 can also convert the wavelength of a channel as needed, to avoid channel collision on the output links. At this point, the regenerator resource is marked as allocated.

Thus, the steps needed for lighting a wavelength in photonic network 1 of FIG. 2 are:
- First, connect the client interfaces 7 to the respective flexibility site.
- Next, activate the wavelength from a network operating center NOC, which involves a simple point and click operation.

Signaling and control system 9 together with network and element management system 11 administer the automatic activation of the service, which takes seconds.

It is readily apparent that the TTB is significantly reduced as compared to the complexity of lighting a wavelength in network 1.

In addition to the traditional definition of network resources, the present invention provides for expanding the definition of network resources to physical layer parameters of the network, such as power levels of the optical signals, the gain of optical amplifiers, the quality factor Q of an A-Z path, etc. As discussed above, the signaling and control system 9 together with network and element management system 11 collect both network topology information, and information about operation of the physical layer. Connectivity maps and the number and identification of the express input/output ports on the wavelength switches, together with the number and ID of the add/drop ports on the wavelength switches and OADMs are also treated as the network resources.

As well, the present invention introduces a new class of network resources, namely the shared resources, as for example the channel wavelengths, transponders and regenerators. As described in the above referenced co-pending patent application "Wavelength Routing and switching mechanism for a photonic network", U.S. patent application Ser. No. 09/909,925 to Smith et al, filed on Jul. 19, 2001 network 1 is provided with a wavelength routing and switching system which allocates wavelengths to A-Z paths, and keeps records of wavelength assignment. As described in patent application "Architecture for a photonic transport network", U.S. patent application Ser. No 09/876,391 to Roorda et al, filed on Jun. 7, 2001, network 1 is provided with a pool of regenerators provided at some or all flexibility sites for use by the passthru channels when/if needed for regeneration of wavelength conversion. Also, network 1 uses tunable transmitters and broadband receivers, so that a channel can use any transponder by selecting a laser of that channel wavelength. This is described in detail in patent application "Electro-optic subsystem for a wavelength division multiplexed network", U.S. patent application Ser. No. 09/877,943 to Solheim et al, filed on Jun. 8, 2001, which is incorporated herein by reference.

The line system (amplifiers, dispersion compensation modules, dynamic gain flattening filters, etc) can also be considered a shared resource. As known, an optical amplifier amplifies all channels passing through it.

According to the method and system for monitoring network resources utilization a unit of engineering is the optical span between flexibility points, and a unit of provisioning is the wavelength. The network controls the wavelength set-up such as to result in the lowest operational cost and fastest provisioning cycle. Shared resources such as line systems and regenerators are engineered for a target wavelength capacity and the resources are consumed as new wavelengths are provisioned.

Figure 3:
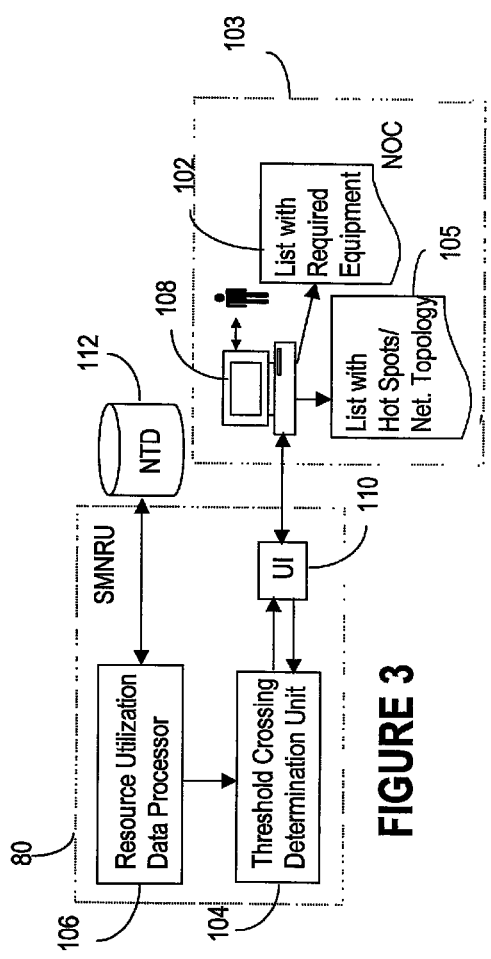
FIG. 3 is a block diagram of the system for monitoring network resources utilization in accordance with an embodiment of the present invention.

FIG. 3 shows the system for monitoring network resources utilization 80 in accordance with an embodiment of the present invention, which monitors utilization of resources of network 1 of FIG. 2.

System 80 is provided as a platform that may be independent from the network and node management system 11, but it receives resource utilization information collected by the signalling and control system 9 and processed by network and node management system 11.

Figure 4:
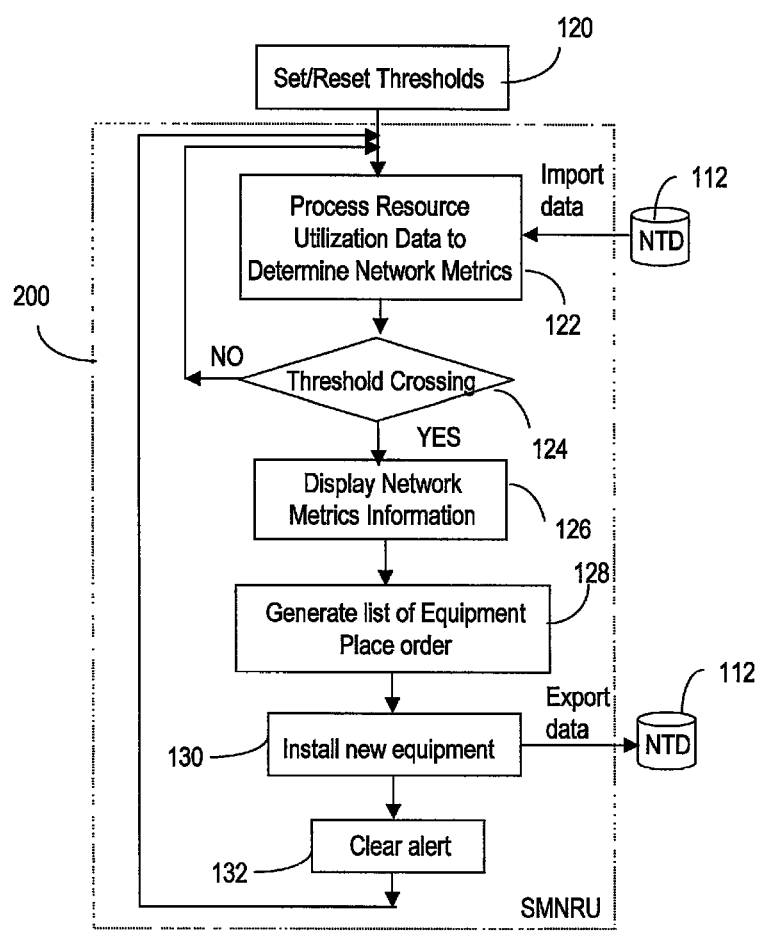
FIG. 4 is a flowchart showing how the system of FIG. 3 treats resource shortages and resource under-utilization at the time of system commissioning, or upon reset of a resource utilization threshold.

As shown in FIG. 3, system 80 comprises a threshold crossing determination unit 104, a resource utilization data processor 106 and a user interface UI 110. The operation of system for monitoring network resource utilization 80 is described also referring to FIG. 4. FIG. 4 shows how the system 80 treats resource shortages and resource under-utilization at the time of system commissioning, or when a resource utilization threshold is reset.

A resource utilization threshold is set by the user on e.g. a terminal 108 and input to system 80 over interface UI 110, step 120. Threshold setting may be performed at network deployment time, or whenever needed. Terminal 108 may be located at any network operating center (NOC) 103.

The resource utilization data processor 106 imports resource utilization data from the network topology database NTD 112 and processes this data into network metrics data, as shown in step 122. Network metrics indicate when to expand the network. For example, the processor 106 imports fiber utilization data from database 112, and determined the number of wavelengths provisioned on each fiber link versus the engineered capacity. Other metrics determined by processor 106 are for example the regenerator allocation/node and client system port utilization.

The threshold crossing determination unit 104 determines if a threshold crossing has occurred or not, step 124, based on the network metrics data and the thresholds. Terminal 108 displays resource utilization information explicitly showing alerts when a threshold has been crossed, as shown in step 126. The indication of the alerts can be in the form of a list with 'hot spots' or a topology view 105, which highlights the respective areas. For example, optical network operators can trigger network expansion when certain network components are nearing exhaust, step 128. A list with the required equipment 102 is also provided by the resource utilization data processor 106 and may be printed by terminal 108 as a purchase order for example, step 128. The information regarding the new resources is exported to the NTD 112.

In general, after new resources are deployed to the hot spots, or under-utilized resources are re-deployed, the new topology is discovered by signalling and control system 9, which also updates the database 112 with this new information. At this point, the threshold crossing alerts are cleared, step 132. In this way, the system for monitoring network resources utilization 80 operates always on updated topology information.

The monitoring thresholds are provisioned based on network engineering practices, and are selected to trigger capacity upgrade as soon as necessary. A threshold may be expressed as the number of resources currently available, or a ratio defined by the number of resources used versus the number of resources originally available. It may be set for a group of resources, or for each type of the resources at each node separately. For example, the thresholds could be the number of regenerators operating at 75% capacity and above, the number of active regenerators performance crossing alarms, the number of provisioned wavelengths, etc.

A monitoring threshold is typically an over-utilization threshold indicating over utilization of the corresponding resources. A monitoring threshold may also indicate under-utilization of the corresponding components. By using an under-utilization threshold, system 100 can track if too many unused resources exist in the network at a certain site, or certain moment in time. The under-utilization information assists redeployment of the under-utilized components at a "hot spot", i.e., a location where the components are over utilized, or as an indication to route a wavelength around a "hot spot".

Preferably, step 120 of setting the monitoring thresholds is carried out before step 122 (processing resource utilization data), but the order of these steps may be changed.

It is preferable to assign thresholds to all shared network resources such as the transponders, regenerators, and/or wavelengths.

Figure 5:
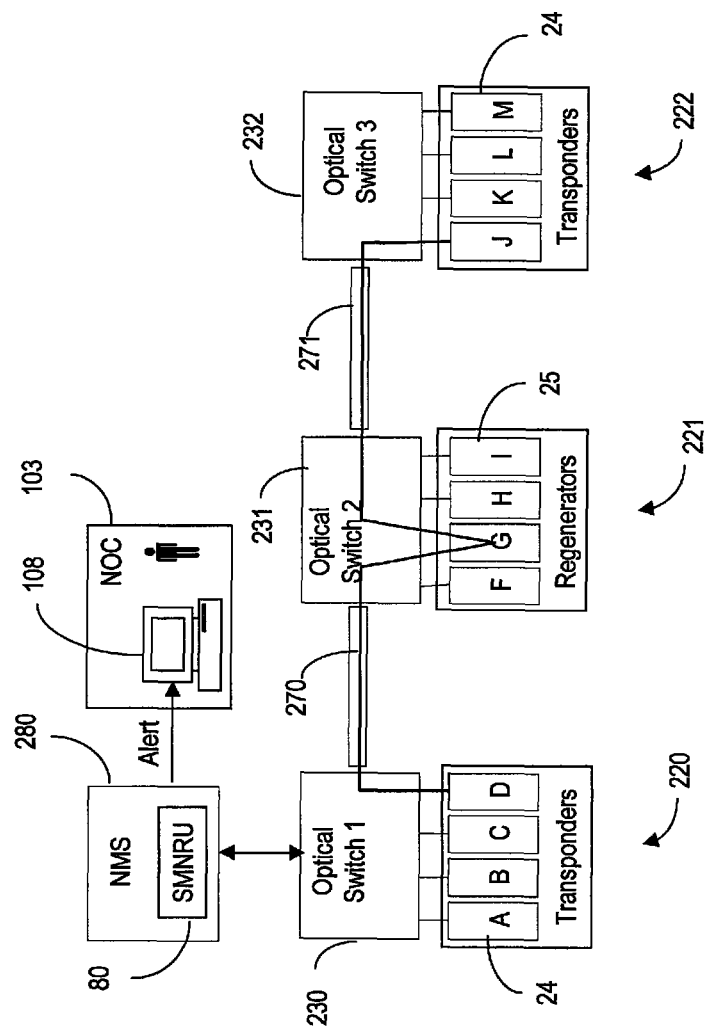
FIG. 5 is an example of using thresholds to indicate where resource capacity expansion is required.

FIG. 5 is an example of using thresholds to indicate where additional regenerators are needed at a node. Here, node 220 is equipped with four transponders 210 denoted with A, B, C and D. Node 221 is equipped with four regenerators 241 denoted with F, G, H and I, and node 222 has transponders 252 denoted with J, K, L and M. The number of DWDM wavelengths on an optical fibre 270, 271 is a fixed number depending on the DWDM system design.

The network operator may, for example, set an over-utilization threshold of ¾ for regenerators at optical switch 231. This indicates that a threshold crossing alert would be generated when three regenerators are used at node 221.

An operator in a network operating center 103 requests a new service, namely a connection between node 220 and node 222. The network management system (NMS) 280 (which includes generically the signalling and control system 9, network and element management system 11, and the database 112) detects a route that passes through intermediate node 221 and assigns to this route transponders D and J and a wavelength λ on optical fibres 270 and 271. Since the distance between the nodes 220 and 222 is large, system 280 also provisions a regenerator G at the intermediate site or node 221. Another scenario will be that NMS 280 was unable to find a one-wavelength route and regenerator G is needed for wavelength conversion from λ on optical fibre 270 to λ1 on optical fibre 271. However, for simplicity of the example we consider that regenerator G is needed for signal conditioning. Thus, the resources needed to support this network connection are regenerator G, transponders D and J and a wavelength λ.

Figure 6:
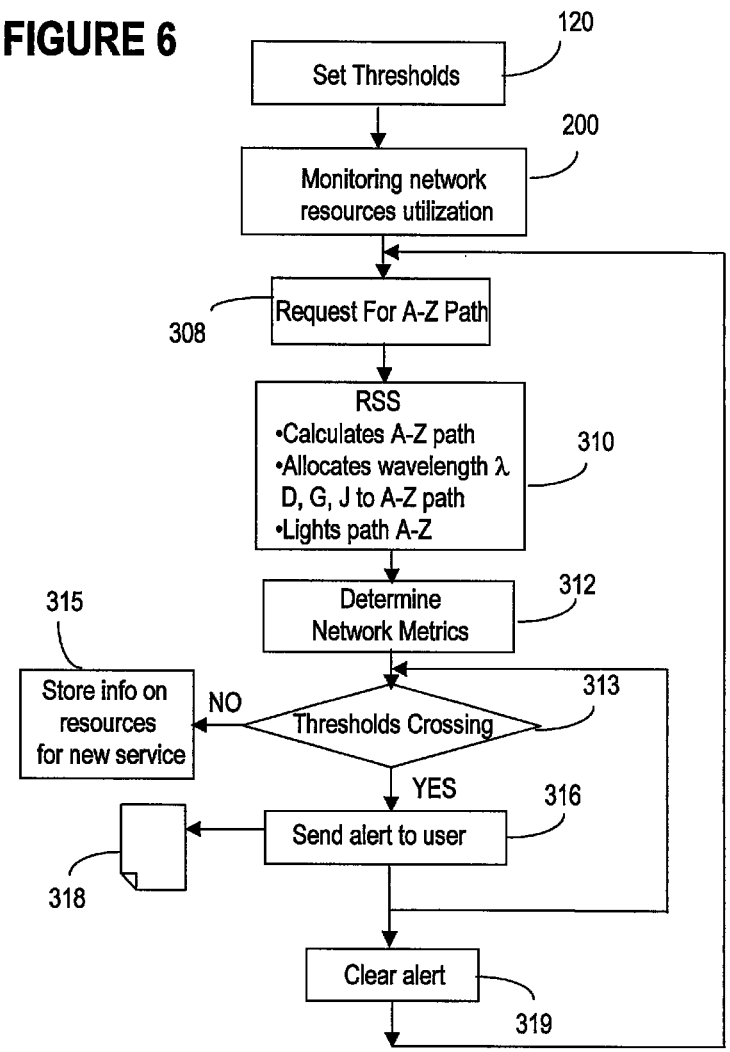
FIG. 6 is a flowchart showing an example of how system of FIG. 3 operates in response to a new wavelength request.

This is also shown on the flowchart of FIG. 6, which is a continuation of the Flowchart of FIG. 4, as shown by steps 120 and 200. At step 308, the request for the A-Z path is received and the network manager uses the routing and switching system (RSS) to determine the path, calculates the path, allocates the resources, and lights the path between transponders D and J, step 310.

System 80 determines the network metrics for the new resource allocation, step 312, and evaluates the threshold crossing, step 313. If the threshold for utilization of the transponders at nodes 220 and 222, the threshold for utilization of regenerators at node 221 and the threshold for utilization of wavelengths on fibers 270 and 217 are not crossed, the path information is stored in the database 112, step 315. In the meantime, the network auto-discovery functionality updates the topology and resource information in database 112.

Let suppose that the regenerator threshold has been crossed. If for example the regenerator threshold has been crossed, i.e. the number of regenerators in use at node 221 became 3 or 4, system 80 issues a threshold crossing alert to the user, step 316 and the respective resource over-utilization is addressed by placing an order for additional equipment, step 318.

After the new equipment has been installed, the database is updated with the new resource information, including connectivity and address, and the alert is cleared, step 319. The operation goes back to step 308 for receiving the next request.

In the above example, a new equipment is ordered in response to the over-utilization alert. Alternatively, or until the new equipment is installed, the alert information may be used in routing policy control for optimal resource usage to avoid "hot-spots". The network may also try a reconfiguration, namely to allocate a regenerator from a node which has a low utilization metric to a node having a high utilization metric. Also, the present invention may be implemented at the network element management layer (flexibility site level), or at the network management system layer. When it is implemented in the network element management layer, the threshold settings may be provisioned on each network element. Threshold crossings may be reported through an event notification as network elements are used. When it is implemented in the network management system layer, the threshold evaluation may be triggered after a network connection is established. Alternately, threshold evaluation may be implemented as a periodic calculation.

Figure 7:
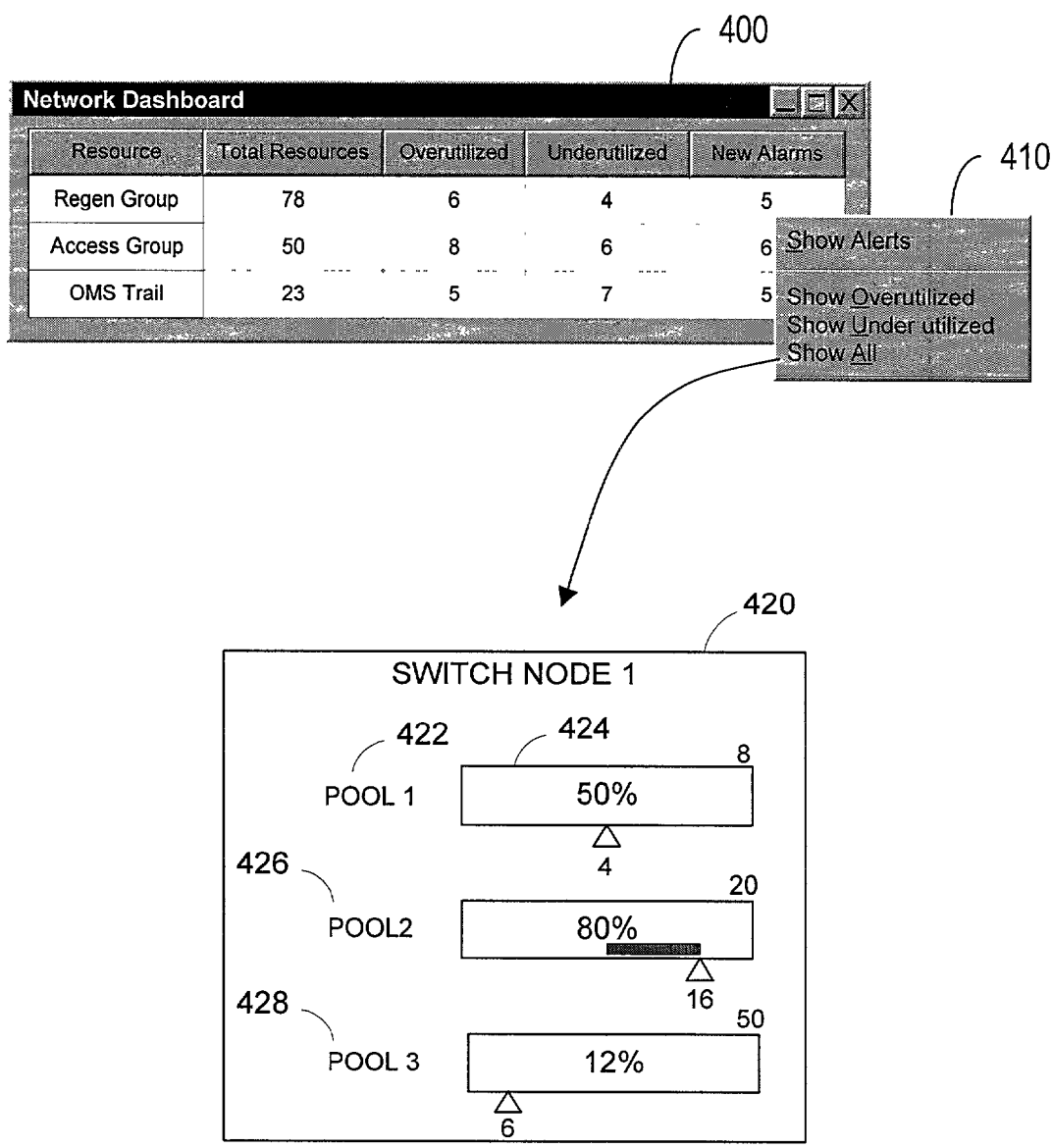
FIG. 7 is a diagram showing a user interface in accordance with an embodiment of the present invention.

FIG. 7 shows an example of a user interface 110 used in a monitoring system, which monitors utilization information of regenerators, accesses and OMS trails.

In this example, the user interface 110 show threshold crossings as a first order indication 400. There are four columns displayed in this view. The first column, Resource, contains the name of the category of resource being summarized. The second column, Total Resources, contains the total number of resources that exist in the network. For Access and Regenerator groups, this number does not include the groups that do not have any Circuit Packs provisioned. For "OMS Trail", it does include the OMS Trails that have no channel used. The third column, Overutilized, contains the total number of overutilized resources in the network. The fourth column, Underutilized, contains the total number of underutilized resources in the network. The last column, New Alarms, show how many alerts are generated against that category of resource. This number includes only the new, unacknowledged alerts. The user interface provides an alert menu 402. The menu 402 allows the user to select to see overutilized alerts, underutilized alerts or all alerts. Clicking on a desired selection on the menu 402, a second order indication will appear. For example, the second order view may look like the view denoted with 420. In this view, a list of relevant resource pools 422 is shown with a slide bar 424 which indicates utilization of the resources in each pool. In this example, 80% of regenerators are being used in the second regenerator pool 426. Thus, the operator can locate the "hot spot" where the resources are nearing exhaust. Also, this view indicates that only 12% of regenerators are being used in the third regenerator pool 428. Thus, the unused regenerators in the third regenerator pool may be considered for redeployment to the second regenerator pool.

As shown in the view 420, the number of resources may be indicated together with the slide bars 424.

In this view 420, when the alerts are drilled down, the list of relevant resource pools is shown. It may show only the regenerator pool that caused the alert depending the selection in menu 410.

The present invention may be suitably used in an optical network in which the network management system or each node is capable of dynamically automatically allocating network resources, as well as in an optical network in which network resources are fixedly allocated.

The system for monitoring network resources utilization of the present invention may be implemented in software, hardware, or a combination of software and hardware having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A network utilization monitoring system for monitoring utilization of photonic network resources in a photonic network, the system comprising:
    a resource utilization data processor configured to dynamically obtain resource utilization data regarding shared photonic network resources of interest including the utilization of deployed equipment and physical layer parameters, the resource utilization data being expressed as a number of photonic network resources being used;
    a threshold crossing determination unit configured to determine whether a threshold crossing has occurred by calculating a utilization ratio based on the number of photonic network resources being used versus a total number of photonic network resources available, and comparing the utilization ratio to at least one pre-set monitoring threshold associated with network engineering practices and selected to trigger capacity upgrade of the shared photonic network resources to thereby increase the total number of photonic network resources available; and
    a user interface configured to indicate utilization information of the shared photonic network resources in accordance with the determination of the threshold crossing determination unit, and configured to set the at least one pre-set monitoring threshold expressed as a ratio of a number of photonic network resources being used and a total number of photonic network resources available.

2. The monitoring system as claimed in claim 1, the user interface for further indicating information regarding an alert when the threshold crossing determination unit determines that a threshold crossing has occurred.

3. The monitoring system as claimed in claim 1, the user interface for further allowing users to set the at least one pre-set monitoring threshold.

4. The monitoring system as claimed in claim 3, the user interface for further setting as the at least one pre-set monitoring threshold both an over-utilization threshold and an under-utilization threshold.

5. The monitoring system as claimed in claim 1 further comprising a database for storing the at least one pre-set monitoring threshold.

6. The monitoring system as claimed in claim 1, wherein the shared photonic network resources comprise wavelengths, transponders or regenerators provisioned in a node of the photonic network.

7. The monitoring system as claimed in claim 1, the resource utilization data processor for further obtaining resource utilization data through an event notification.

8. The monitoring system as claimed in claim 1, wherein
    the shared photonic network resources of interest comprise different types of resources;
    the user interface for further setting a separate monitoring threshold for each of the different types of shared photonic network resources of interest;
    the resource utilization data processor for further obtaining utilization data of each of the different types of shared photonic network resources of interest; and
    the threshold crossing determination unit for further determining a separate threshold crossing for each of the different types of shared photonic network resources of interest and selected to trigger capacity upgrade upon threshold crossing.

9. The monitoring system as claimed in claim 1, the resource utilization data processor for further obtaining the number of network resources available.

10. The monitoring system as claimed in claim 1, wherein
    the photonic network comprises a network node having network resources of interest, and a network managing system for managing the network node; and
    the monitoring system is provided in the network managing system.

11. The monitoring system as claimed in claim 10, wherein
    the network management system comprises a signaling and control system for receiving the resource utilization data from the network node; and
    the resource utilization data processor for further obtaining the resource utilization data from the signaling and control system.

12. The monitoring system as claimed in claim 1, wherein
    the photonic network comprises a network node having network resources of interest, and a network managing system for managing the network node; and
    the monitoring system is provided in the network node.

13. The monitoring system as claimed in claim 12, the network node for further receiving a request for service for allocating a network resource to the request for service, and for adjusting the deployed equipment; and
    the resource utilization data processor for further obtaining the resource utilization data in accordance with the allocation.

14. The monitoring system as claimed in claim 1, wherein the photonic network comprises multiple network nodes and a network managing system for managing the network nodes;
    the resource utilization data processor is provided in each network node having network resources of interest; and
    the user interface is provided in the network management system for indicating the utilization of network resources in the network management system.

15. The system as in claim 1 wherein the physical layer parameters comprise a group consisting of at least optical signal power level, optical amplifier gain, quality factor Q of a path, and a number and ID of an added or dropped port of a wavelength switch or add/drop multiplexer.

16. A method for monitoring utilization of network resources in a photonic network comprising:
    setting a monitoring threshold for monitoring utilization of shared photonic network resources of interest comprising utilization of deployed equipment and physical layer parameters, the monitoring threshold expressed as a ratio of a number of photonic network resources being used and a total number of available photonic network resources, wherein the monitoring threshold is associated with the network engineering practices and selected to trigger capacity upgrade of the shared photonic network resources to thereby increase the total number of available photonic network resources;
    obtaining resource utilization data indicating current utilization of the shared photonic network resources, wherein the resource utilization data is expressed as the number of photonic network resources being used;
    through a user interface, determining if a threshold crossing has occurred by calculating a utilization ratio based on the number of photonic network resources being used versus the total number of available photonic network resources, and comparing the utilization ratio to the monitoring threshold and through a user interface, indicating utilization information of the shared photonic network resources in accordance with the determination of the threshold crossing.

17. The method as claimed in claim 16 further comprising indicating an alert when the threshold crossing is determined to have occurred.

18. The method as claimed in claim 16 further comprising setting an over-utilization threshold and an under-utilization threshold.

19. The method as claimed in claim 16 further comprising setting the monitoring threshold for optical fibers, transponders or regenerators provisioned in a node of the optical network.

20. The method as claimed in claim 16, wherein the network resources of interest comprise different types of resources, and the method further comprises
setting a separate capacity monitoring threshold for each of the different types of resources;
obtaining resource utilization data for each of the different types of resources; and
determining a threshold crossing for each of the different types of resources.

21. The method as claimed in claim 16 further comprising obtaining the number of available network resources.

22. The method as claimed in claim 16, wherein the photonic network comprises a network node, and a network managing system for managing the network node, wherein the method is further executed in the network managing system; and
the method further comprises obtaining the resource utilization data from the network management system.

23. The method as claimed in claim 22 further comprising obtaining the resource utilization data in accordance with allocation of the network resources to a request for service.

24. The method as claimed in claim 18, wherein the photonic network comprises a network node, and a network managing system for managing the network node; and
the method is further executed in the network node.

25. The method as claimed in claim 24 further comprising:
receiving a request for service;
allocating a network resource to the request for service;
adjusting the deployed equipment; and
obtaining the resource utilization data in accordance with the allocation.

26. The method as in claim 16 wherein the physical layer parameters comprise a group consisting of at least optical signal power level, optical amplifier gain, quality factor Q of a path, and a number and ID of an added or dropped port of a wavelength switch or add/drop multiplexer.

27. A method for monitoring utilization of shared photonic network resources in a photonic network comprising:
setting a monitoring threshold for monitoring utilization of shared photonic network resources associated with network engineering capacity of the shared photonic network resources, wherein the monitoring threshold is expressed as a ratio of a number of photonic network resources being used and a total number of available photonic network resources;
discovering a number of available photonic network resources of interest;
receiving a number of photonic network resources that are being used;
through a user interface, determining a monitoring threshold crossing based on the received number, the monitoring threshold and the discovered number of available photonic network resources, the monitoring threshold selected to trigger capacity upgrade upon threshold crossing, by calculating a utilization ratio based on the number of photonic network resources being used versus the total number of available photonic network resources, to thereby increase the total number of available photonic network resources;
and through the user interface, indicating utilization information of the shared photonic network resources by obtaining resource utilization data which is expressed as the number of photonic network resources being used and indicates utilization of the photonic network resources that comprises utilization of deployed equipment and physical layer parameters.

28. A method for presenting utilization information of shared network resources in a photonic network comprising:
presenting information of photonic network resources to which a monitoring threshold is provisionable, wherein the monitoring threshold is expressed as a ratio of a number of photonic network resources being used and a total number of available photonic network resources, and wherein the monitoring threshold is defined as associated with network engineering practices and selected to trigger capacity upgrade of the shared network resources to thereby increase the total number of available photonic network resources;
accepting provisioning of the monitoring threshold for monitoring utilization of the photonic network resources;
indicating utilization information of the photonic network resources through a user interface by obtaining resource utilization data which is expressed as the number of photonic network resources being used and indicates utilization of the photonic network resources that comprises utilization of deployed equipment and physical layer parameters; and
determining whether a threshold crossing has occurred based on the resource utilization data and the monitoring threshold.

29. The method as claimed in claim 28 further comprising presenting network metrics information including alert data relating to the threshold crossing.

30. The method as claimed in claim 28 further:
providing an alert when the threshold crossing occurs;
presenting menus related to the alert; and
indicating a location of the threshold crossing.

\* \* \* \* \*